United States Patent
Dubugnon et al.

(10) Patent No.: US 11,585,748 B2
(45) Date of Patent: Feb. 21, 2023

(54) ASSEMBLY FOR MEASURING THE RELATIVE HUMIDITY LEVEL INSIDE A WATCH CASE

(71) Applicant: The Swatch Group Research and Development Ltd, Marin (CH)

(72) Inventors: Dominique Dubugnon, Saint-Prex (CH); Cédric Blatter, Commugny (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/479,421

(22) Filed: Sep. 20, 2021

(65) Prior Publication Data

US 2022/0120668 A1     Apr. 21, 2022

(30) Foreign Application Priority Data

Oct. 16, 2020   (EP) ..................................... 20202327

(51) Int. Cl.
| | | |
|---|---|---|
| *G01N 21/17* | (2006.01) | |
| *G04D 7/00* | (2006.01) | |
| *H04R 1/08* | (2006.01) | |
| *H04R 23/00* | (2006.01) | |

(52) U.S. Cl.
CPC ......... *G01N 21/1702* (2013.01); *G04D 7/004* (2013.01); *H04R 1/08* (2013.01); *H04R 23/008* (2013.01); *G01N 2021/1704* (2013.01); *G01N 2201/0636* (2013.01); *G01N 2201/06113* (2013.01)

(58) Field of Classification Search
CPC ....... G01N 21/1702; G01N 2021/1704; G01N 2021/1708; G01N 2201/06113; G01N 2201/0636; G01N 29/02; G04D 7/004; G04D 7/007; H04R 1/08; H04R 23/008; G01M 3/04; G01M 3/24

See application file for complete search history.

(56) References Cited

U.S. PATENT DOCUMENTS

| | | | | |
|---|---|---|---|---|
| 3,577,876 A | * | 5/1971 | Spadini | ............... G04G 13/021 368/291 |
| 3,802,251 A | | 4/1974 | Durr | |
| 10,474,194 B1 | * | 11/2019 | Ell | ........................ G06F 1/1633 |
| 2018/0181075 A1 | | 6/2018 | Born et al. | |

FOREIGN PATENT DOCUMENTS

| | | |
|---|---|---|
| CH | 314386 A | 6/1956 |
| EP | 3 598 246 A1 | 1/2020 |

OTHER PUBLICATIONS

European Search Report of European Application No. 20 20 2327 dated Mar. 31, 2021.

* cited by examiner

*Primary Examiner* — Suman K Nath
(74) *Attorney, Agent, or Firm* — Sughrue Mion, PLLC

(57) ABSTRACT

An assembly (1) for measuring a relative humidity level inside a watch (2), the watch (2) provided with a movement (10) and a device (4) for determining the humidity level present in the enclosure (9) of a case (3) of this watch (2). The determination device (4) includes a receiver module (6a, 6b, 6c) for receiving at least one acoustic signal from a timepiece component (11) of said movement (10), and a control unit (7) connected to said receiver module (6a, 6b, 6c). The control unit (7) is configured to run a model for evaluating a water vapour content of a gaseous fluid contained inside the enclosure (9) based on the at least one acoustic signal received by the receiver module (6a, 6b, 6c).

13 Claims, 1 Drawing Sheet

ASSEMBLY FOR MEASURING THE RELATIVE HUMIDITY LEVEL INSIDE A WATCH CASE

CROSS REFERENCE TO RELATED APPLICATIONS

This application claims priority to European Patent Application No. 20202327.1, filed on Oct. 16, 2020, the entire contents of which are incorporated herein by reference.

FIELD OF THE INVENTION

The invention relates to an assembly for measuring the relative humidity level inside a watch case.

BACKGROUND OF THE INVENTION

The water-resistance of a watch is measured in bars (a bar is a unit of pressure where 1 bar equals 1 atmosphere (atm)). The water-resistance of a watch is often indicated in metres (m). A watch that is described as water-resistant is intended for ordinary everyday use that must guarantee resistance to water, for example during activities such as swimming or simply in the shower. A so-called diving watch has to comply with stricter standards and, according to the current standard, guarantee water-resistance up to a minimum depth of 100 m.

To guarantee water-resistance, watches are usually provided with a set of watertight seals positioned in the assembly points of certain parts of the watch, such as the crystal, the bezel and the back of the watch, as well as of moving parts such as the crown and the push buttons. Over time and with use, the mechanical properties of the seals change and the water-resistance of the watch can sometimes deteriorate. This makes the watch more permeable to water or water vapour. This can result in condensation phenomena on the inside face of the watch crystal, or worse, in the oxidation of certain metal components or the degradation of certain polymer components. There is thus a need to be able to monitor the relative humidity level inside the watch from time to time without necessarily having to open it, since opening the watch case would require systematically replacing the seals and the intervention of a watchmaker, which is expensive. Excessive water vapour inside the watch can indicate that one or more seals need to be replaced in the short to medium term.

In order to meet this need, some watches are known to include a device for measuring the relative humidity level inside the watch. Such a measuring device takes the form of an electronic module capable of measuring and recording values of various environmental parameters, including relative humidity. Due to the small size of such an electronic module, it can be arranged inside a watch case and can measure, via a dedicated sensor, the relative humidity level inside the watch case. The measured relative humidity values can then be transmitted to a watch docking station wirelessly, typically by infrared or radio frequency means. The signal, which is for example an infrared signal, emitted by the electronic module thus passes through a transparent portion of the watch case, typically the crystal, and is received by an infrared sensor of the docking station. A user of the watch can then view the measured relative humidity values using a computer connected to the docking station and on which dedicated software has been installed, or using a smartphone.

However, one drawback of such an electronic measuring device is that it requires a battery or a cell to power the various electronic components. Such a device is thus relatively unsuitable for mechanical watches in particular. Moreover, for electronic watches, it can reduce the autonomy of a product or require the use of a larger capacity battery and thus increase the volume of the watch.

Another drawback is that such a device is relatively bulky and not very discreet inside the watch. Furthermore, such an electronic measuring device is relatively expensive and thus has repercussions on the manufacturing cost of the watch.

SUMMARY OF THE INVENTION

The purpose of the invention is thus to provide an assembly for measuring the relative humidity level present inside a watch case, thus making it possible to detect in particular a defect in the water-resistance of such a case, by monitoring the relative humidity level inside this case without having to open it. Such a measurement assembly is cost-effective, easy to use and procures a reliable and fast measurement of the relative humidity level inside the watch case.

The invention relates to an assembly for measuring a relative humidity level inside a watch, comprising said watch provided with a movement and a device for determining the humidity level present in the enclosure of a case of this watch, the determination device comprising:
  a receiver module for receiving at least one acoustic signal from a timepiece component of said movement, and
  a control unit connected to said receiver module,
said control unit being configured to run a model for evaluating a water vapour content of a gaseous fluid contained inside said enclosure based on said at least one acoustic signal received by the receiver module.
  According to other embodiments:
  the receiver module comprises a pressure microphone or a pressure-gradient microphone;
  the receiver module comprises an optical microphone;
  the optical microphone comprises a source of electromagnetic radiation, reflective elements such as mirrors, at least one detector for detecting this electromagnetic radiation and an interferometer;
  the measurement assembly comprises an emitter module provided with a source of light radiation capable of emitting light beams to the movement of the watch;
  the source of light radiation is a laser source;
  the measurement assembly comprises an emitter module provided with a source of acoustic radiation capable of sending an acoustic signal into the watch, in particular to the movement of this watch;
  the emitter module is connected to said control unit;
  the control unit comprises, in the memory elements thereof, a learning algorithm for evaluating a relative humidity level inside a watch as a function of sound identity/signature characteristics derived from the processing of the acoustic signals received by the receiver module;
  the model is generated by said algorithm run by the control unit;
  the control unit is configured to determine an input value for this model, which in this case is a value of the acoustic signal measured by the receiver module;
  the control unit is configured to obtain an output value resulting from running the model with the input value, said output value comprising the water vapour content of the gaseous fluid contained inside the enclosure of the case;

the gaseous fluid is air containing water vapour.

BRIEF DESCRIPTION OF THE DRAWINGS

The purposes, advantages and features of this assembly for measuring a relative humidity level inside a watch will appear more clearly in the following description which is given on the basis of at least one non-limiting embodiment shown by way of the drawings, in which.

DETAILED DESCRIPTION OF THE PREFERRED EMBODIMENTS

Figure 1:
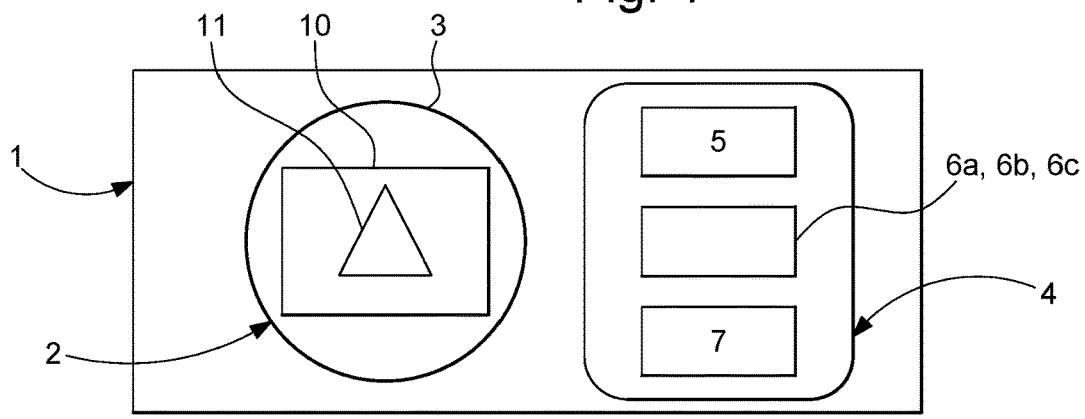
FIG. 1 is a diagrammatic view of an assembly for measuring the relative humidity level inside a watch, according to one embodiment of the invention.

FIGS. 1 to 4 show several alternatives of an assembly 1 for measuring a relative humidity level inside a watch 2. The "relative humidity level" is understood herein to mean the ratio between the partial pressure of the water vapour contained in the air and the saturation vapour pressure at the same temperature. In other words, the measurement of the relative humidity level corresponds to a measurement of the ratio of the water vapour content of the air to the maximum water vapour capacity thereof under the same temperature conditions.

This measurement assembly 1 comprises the watch 2 and in particular the case 3 of the watch 2, as well as a device 4 for determining the humidity level present in the enclosure 9 of this case 3 of the watch 2. Such a measurement assembly 1 is able to determine the relative humidity level inside the watch 2 from an acoustic signal originating from at least one timepiece component 11 of a movement 10 of the watch. This timepiece component 11 can comprise a single horological element capable of generating a sound wave or at least two horological elements capable of generating a sound wave by working together within the operation of the movement 10. This timepiece component 11, when it comprises a plurality of horological elements, can be referred to as a "horological mechanism". In this context, it can be, for example, an escapement mechanism of a watch, a minute repeater mechanism or a stepping motor of a quartz watch.

In this measurement assembly 1, the watch 2 can be, for example, a mechanical watch or an electronic watch, in particular a smart watch.

The determination device 4 of this measurement assembly 1, comprises a receiver module 6a to 6c for receiving at least one acoustic signal originating from said at least one timepiece component 11 of the movement 10 arranged inside the enclosure 9 of the case 3. This determination device 4 further comprises a control unit 7 connected to this receiver module 6. Alternatively, as will be seen hereinbelow, such a determination device 4 can further comprise an emitter module 5 which is also connected to the control unit 7 and which is provided with a source of light radiation and/or with a source of acoustic radiation. It should be noted that the source of acoustic radiation is capable of sending an acoustic signal into the watch from the environment outside the watch.

Such an emitter module 5 can comprise a device capable of striking the watch, in particular the case thereof. In particular, such a device can comprise a mechanism capable of animating at least one hammer such that it strikes the case 3 of the watch 2 in order to generate an acoustic signal towards the movement of this watch 2. In this context, it is understood that such a hammer is configured to strike this case 3 without damaging it.

In this determination device 4, the receiver module 6a to 6c for receiving at least one acoustic signal originating from at least one timepiece component 11 of the movement 10 comprises at least one electroacoustic transducer which is able to convert an acoustic signal into an electrical signal. In a first alternative, such a receiver module 6a, 6b can comprise at least one pressure microphone 6a or pressure-gradient microphone 6b generally provided with a diaphragm or with a piezoelectric element which is capable of deforming and/or moving under the effect of an acoustic signal. In a second alternative, this emitter module 6c can comprise at least one optical microphone 6c. Such a microphone 6c, which is described in more detail in the European patent document EP2338287B1, is a device that is able to convert an acoustic signal into an electrical signal using interferometry-based technology. Such a microphone 6c in particular comprises a source of electromagnetic radiation, reflective elements such as mirrors, at least one detector for detecting this electromagnetic radiation and an interferometer such as a Fabry-Perot interferometer or a Gires-Tournois etalon. It should be noted that in another alternative of this determination device 4, the emitter module 6a to 6c can comprise any combination of the following microphones 6a to 6c: at least one pressure microphone 6a, at least one pressure-gradient microphone 6b and at least one optical microphone 6c.

In this determination device 4, the control unit 7 is connected to the receiver module 6a, 6b, 6c and optionally also to the emitter module 5. This control unit 7 is configured to evaluate the water vapour content of the gaseous fluid contained inside said enclosure 9 as a function of said at least one acoustic signal received by the receiver module 6a to 6c. This control unit 7 can be a computer and thus comprise hardware and software resources, in particular at least one processor cooperating with memory elements. This control unit 7 is capable of executing commands to implement a computer program in order to contribute to determining the measurement of the relative humidity level inside the enclosure 9 of the case 3 of the watch 2.

Under these conditions, such a control unit 7 comprises, in the memory elements thereof, a learning algorithm known as a "machine learning algorithm". More particularly, this is a learning algorithm for evaluating a relative humidity level inside a watch as a function of sound identity/signature characteristics derived from the processing of the acoustic signals carried out by the control unit 7. Such an algorithm can comprise or implement at least one neural network and/or an analytical function and/or a principal of polynomial regression. Such an algorithm is able to generate a model for evaluating a water vapour content of a gaseous fluid contained inside the enclosure 9 of the case 3 as a function of at least one acoustic signal measured by the receiver module 6a to 6c. Through the implementation thereof by the control unit 7, such a model allows a value characterising a relative humidity level inside a watch to be determined as a function of said at least one acoustic signal measured by the receiver module 6a to 6c.

This algorithm can be trained automatically, also known as machine learning, which is preferably supervised. For this purpose, the control unit 7, which participates in implementing such training, comprises training data pertaining to acoustic signal measurements and training data pertaining to relative humidity levels inside a watch. These training data are the result of actual measurements made, for example, with a training device comprising, inter alia, a humidity probe arranged inside the closed enclosure of a watch case similar to that of the present watch described herein and an acoustic probe for measuring acoustic signals generated by a source of light radiation and/or a source of acoustic radiation directed at the case. Thus, this training aims at improving the algorithm and in particular the resulting model in order to minimise the error between "estimation and reality" within the scope of the evaluation of the water vapour content present inside the enclosure of the case 3 from at least one acoustic signal received by the receiver module 6a, 6b, 6c.

Moreover, this control unit 7 is capable of controlling the receiver module 6a to 6c in order to participate in the evaluation of the water vapour content of the gaseous fluid contained in the enclosure 9 of the case 3, and is also capable of carrying out operations for processing the acoustic signals measured by this receiver module 6a to 6c. These processing operations enable this control unit 7 to evaluate the humidity level inside the enclosure of the case 3 by running the model for evaluating a water vapour content present in the gaseous fluid contained in said enclosure as a function of said at least one acoustic signal received by the receiver module 6a, 6b, 6c. In this context, the control unit 7 is capable of determining an input value for this model, which in this case is a value of the acoustic signal measured by the receiver module 6a to 6c in order to obtain an output value resulting from the running of this model with this input value, said output value corresponding to the water vapour content of the gaseous fluid contained inside the enclosure of the case. It should be noted that this control unit 7 is in particular capable of implementing signal processing operations through signal modulation and synchronous detection operations in order to determine this input value.

As stated hereinabove, the measurement assembly 1 can further comprise an emitter module 5 which contributes to improving the accuracy of the evaluation of the relative humidity level inside the watch. More specifically, the control unit 7 is capable of controlling this emitter module 5 and the receiver module 6a, 6b, and 6c, in order to obtain an estimate of the relative humidity level present inside the enclosure 9 of the watch case 3, according to an operating mode similar to that described hereinabove.

Such an emitter module 5 can be provided with a source of light radiation. More specifically, it is capable of emitting light beams 8 towards the enclosure 9 of said case 3 and in particular towards the movement 10. Such an emitter module 5 can help to improve the accuracy of the measurement of the humidity level inside the watch. In this emitter module 5, the source of light radiation is preferably a laser source. Alternatively, this source of light radiation can be an infrared light source. This emitter module 5 comprises an element for modulating said source of light radiation configured to generate at least one acoustic signal in said enclosure 9 of the case 3 under the effect of the light beams, in this case of the laser beams, emitted by the emitter module 5. In other words, the element 5 for modulating said source of light radiation is configured such that said emitter module 5 emits light beams capable of ensuring a generation of at least one acoustic signal by the gaseous fluid containing the water vapour contained in the enclosure 9 of the case 3. More specifically, the molecules of the gaseous fluid, in this case air containing in particular water vapour, which are present inside the enclosure 9 of the case 3, are excited to a higher electronic, vibrational or rotational quantum state by absorbing the electromagnetic radiation constituted by these modulated light beams emitted by the emitter module 5. In general, the depopulation of this quantum state to lower states occurs either by fluorescence or by collisions, the latter giving rise to an increase in the temperature of the gaseous fluid due in particular to energy transfer processes. This non-radiative relaxation process occurs when the relaxation time can compete with the radiative lifetime of the excited energy levels. Thus, the modulator element of the emitter module 5, by modulating the source of radiation, contributes to periodically varying the temperature of this gaseous fluid present inside the enclosure 9 of the case 3, which gives rise to a periodic change in pressure in this enclosure 9, which leads to the generation of said at least one acoustic signal inside this enclosure 9. It should be noted that the temperature can also modulate a refractive index, which can be detected optically.

Such an emitter module 5 is capable of emitting femtosecond and/or nanosecond laser pulses. Such femtosecond pulses can be generated from a visible or near-infrared laser. Such a laser can be, for example, a YAG laser emitting at 1064 nm. In particular, it should be noted that the emitter module 5 is capable of simultaneously or serially emitting a plurality of light beams at wavelengths having different absorption coefficients in the gaseous fluid containing the water vapour. Moreover, it should be noted that this module 5 is capable of emitting a YAG-type laser beam optically pumped by means of flash lamps or laser diodes, or even a dye laser. It should be noted that the emitter module 5 can further comprise an optical parametric oscillator, also known by the acronym "OPO". This oscillator is a coherent, monochromatic light source that is preferably used to produce wavelengths where lasers cannot.

In this configuration, this control unit 7 controls the modules 5, 6a, 6b, 6c, in order to contribute to estimating the measurement of the relative humidity level inside the enclosure 9 of the case 3, and is also able to determine input values relating to acoustic signals measured by the receiver module 6a to 6c. In particular, the control unit 7 is capable of implementing signal processing operations through signal modulation and synchronous detection operations. Thus, the control unit 7 is capable of determining output values resulting from running the model with these input values, said output values corresponding to the water vapour content of the gaseous fluid contained inside the enclosure of the case.

It should be noted that the determination device 4 can comprise temperature sensors for measuring the temperature of the watch as well as the temperature of the environment in which said watch is located. These sensors are connected to the control unit 7 and participate in estimating the humidity level inside the case 3. More specifically, this estimate is in particular made when the temperature of the watch and that of its environment are substantially the same or strictly the same.

In this assembly 1, the watch is thus provided with the case 3. Such a case 3 includes a middle 14 which is, for example, annular in shape and which is provided with an upper annular edge on which a crystal 15 of this case 3 rests. This crystal 15, also referred to as a "glass", can be, in a non-limiting and non-exhaustive manner, a mineral glass or a sapphire glass with a thickness that is configured to at least allow the light beams to be transmitted from the emitter module.

Figure 2:
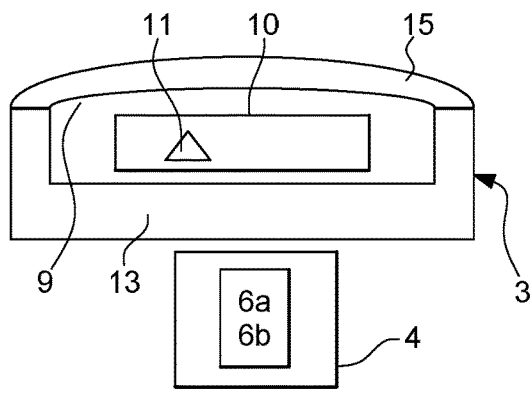
FIG. 2 is a diagrammatic view of a first alternative of the assembly for measuring the relative humidity level comprising a pressure microphone and/or a pressure-gradient microphone, according to the embodiment of the invention.
Figure 3:
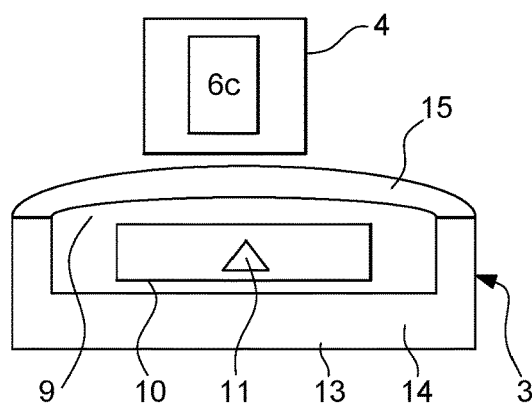
FIG. 3 is a diagrammatic view of a second alternative of this measurement assembly comprising the device for determining the humidity level comprising an optical microphone, according to the embodiment of the invention.
Figure 4:
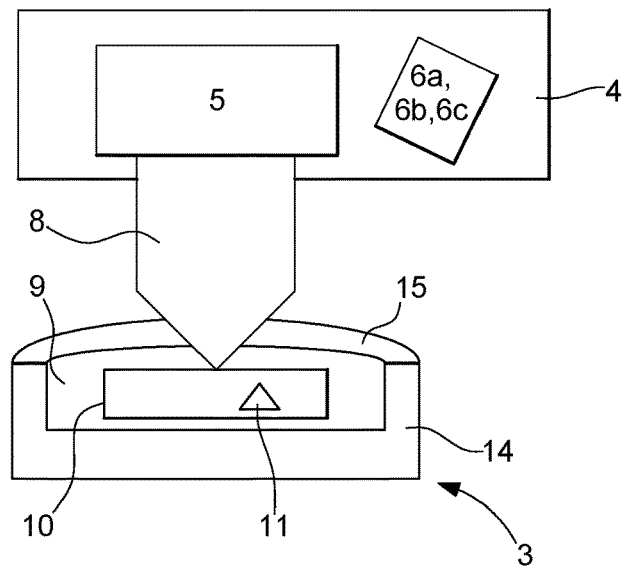
FIG. 4 is a diagrammatic view of a third alternative of this measurement assembly comprising an emitter module provided with a source of light radiation and/or a source of acoustic radiation, according to the embodiment of the invention.

In the case 3 of the watch 2 shown in the example in FIGS. 2 to 4, the configuration thereof is substantially circular. However, the invention is in no way limited to such a configuration.

In the measurement assembly 1, the receiver module 6a, 6b, when it comprises a pressure microphone 6a or a pressure-gradient microphone 6b, can be arranged opposite any of the different parts of the case 3, i.e. opposite the back 13, the middle 14 or the crystal 15. If this receiver module 6c comprises an optical microphone 6c, it is arranged facing the crystal 15 of the case 3.

It should be noted that according to one alternative, the receiver module 6c connected to the control unit 7 can be capable of measuring the vibrations of the middle 14 in order to participate in estimating the relative humidity level inside the enclosure of the watch case. Moreover, the determination device 14 can be a portable or mobile device, i.e. a device 14 that can be carried by a user without requiring a wired connection for its power supply.

On the other hand, the determination device 14 can comprise a display element capable of displaying a plurality of different visual signals depending on the value of the relative humidity level determined by the control unit 7. Depending on the case, each visual signal displayed by the display element thus corresponds to a predetermined relative humidity level value or to a predetermined relative humidity differential value. This display element can be a screen provided with light-emitting diodes or can correspond more simply to light indicators with light-emitting diodes, the illumination of a given diode corresponding to a predetermined relative humidity threshold.

The invention claimed is:

1. An assembly (1) for measuring a relative humidity level inside a watch (2), comprising said watch (2) provided with a movement (10) and a determining device (4) for determining the humidity level present in the enclosure (9) of a case (3) of this watch (2), the determination device (4) comprising:
   a receiver module (6a, 6b, 6c) for receiving at least one acoustic signal from a timepiece component (11) of said movement (10), and
   a control unit (7) connected to said receiver module (6a, 6b, 6c),
said control unit (7) being configured to run a model for evaluating a water vapour content of a gaseous fluid contained inside said enclosure (9) based on said at least one acoustic signal received by the receiver module (6a, 6b, 6c).

2. The measurement assembly (1) according to claim 1, wherein the receiver module comprises a pressure microphone (6a) or a pressure-gradient microphone (6b).

3. The measurement assembly (1) according to claim 1, wherein the receiver module comprises an optical microphone (6c).

4. The measurement assembly (1) according to claim 1, wherein the receiver module comprises an optical microphone (6c), the optical microphone (6c) comprising a source of electromagnetic radiation, reflective elements such as mirrors, at least one detector for detecting this electromagnetic radiation and an interferometer.

5. The measurement assembly (1) according to claim 1, further comprising an emitter module (5) provided with a source of light radiation capable of emitting light beams (8) to the movement (10) of the watch (2).

6. The measurement assembly (1) according to claim 1, further comprising an emitter module (5) provided with a source of light radiation, the source of light radiation being a laser source.

7. The measurement assembly (1) according to claim 1, further comprising an emitter module (5) provided with a source of acoustic radiation capable of sending an acoustic signal into the watch (2), in particular to the movement (10) of this watch (2).

8. The measurement assembly (1) according to claim 1, further comprising an emitter module (5), the emitter module (5) being connected to said control unit (7).

9. The measurement assembly (1) according to claim 1, wherein the control unit (7) comprises, in the memory elements thereof, a learning algorithm for evaluating a relative humidity level inside a watch as a function of sound identity/signature characteristics derived from the processing of the acoustic signals received by the receiver module (6a, 6b, 6c).

10. The measurement assembly (1) according to claim 1, wherein the model is generated by said algorithm run by the control unit (7).

11. The measurement assembly (1) according to claim 1, wherein the control unit (7) is configured to determine an input value for this model, which in this case is a value of the acoustic signal measured by the receiver module (6a to 6c).

12. The measurement assembly (1) according to claim 1, wherein the control unit (7) is configured to obtain an output value resulting from running the model with the input value, said output value comprising the water vapour content of the gaseous fluid contained inside the enclosure of the case.

13. The measurement assembly (1) according to claim 1, wherein the gaseous fluid is air containing water vapour.

* * * * *